April 9, 1940.  A. E. SCHUBERT  2,196,741
DOUBLE SHEET STOP
Filed Dec. 8, 1937  2 Sheets-Sheet 1
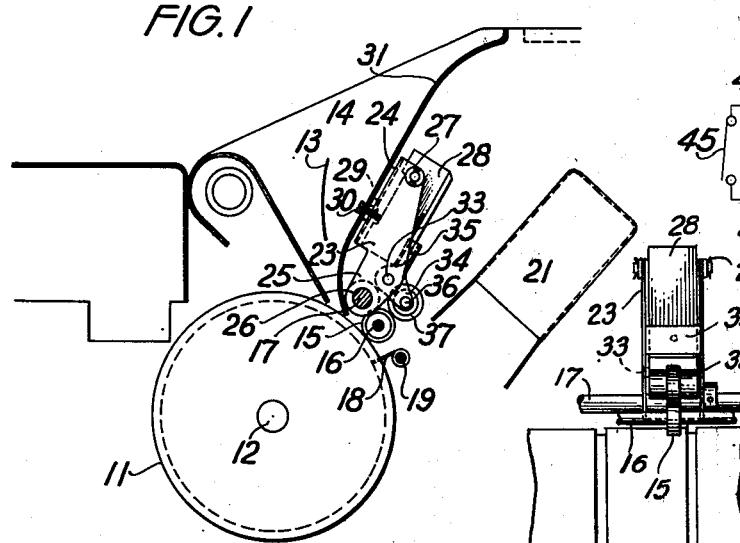
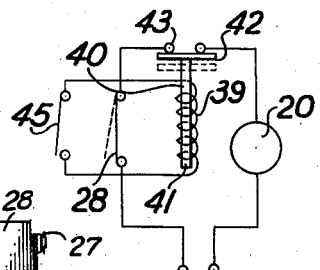
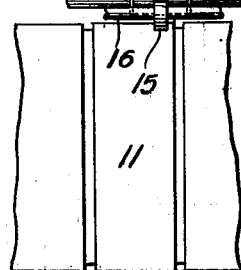
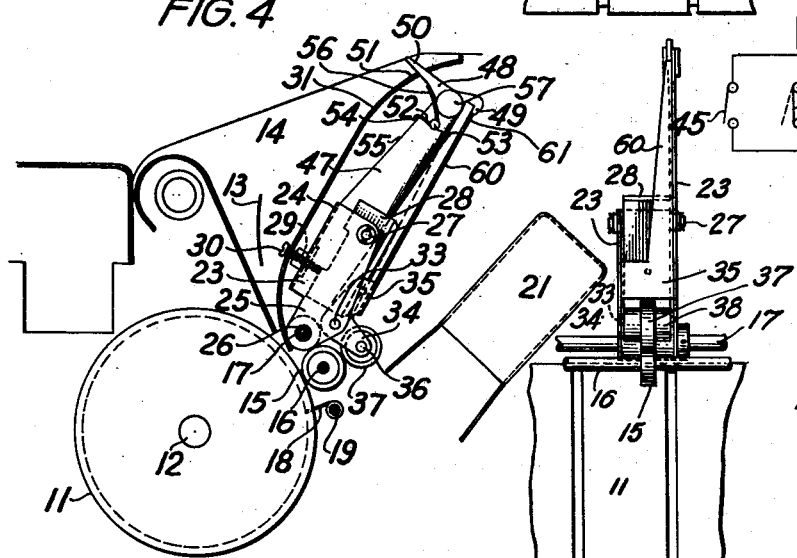
Alvin E. Schubert
INVENTOR
BY
ATTORNEYS April 9, 1940.                A. E. SCHUBERT                 2,196,741
                              DOUBLE SHEET STOP
                          Filed Dec. 8, 1937              2 Sheets-Sheet 2
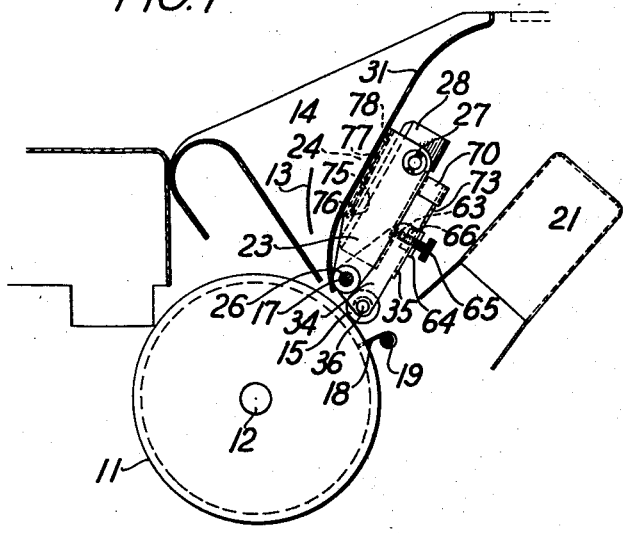
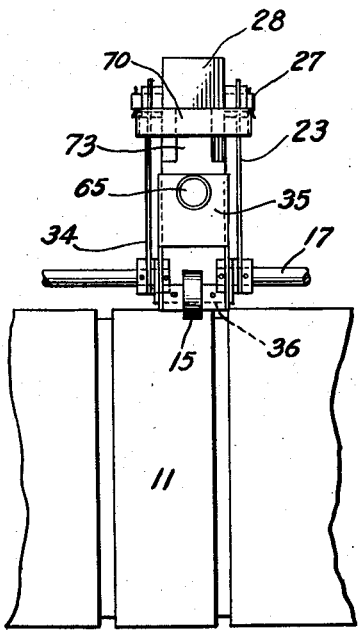
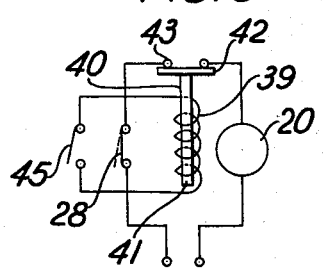
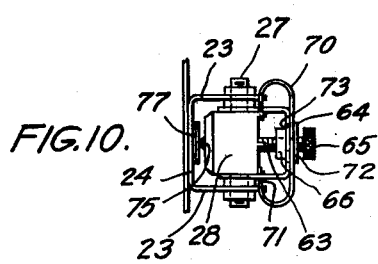
Alvin E. Schubert
INVENTOR
ATTORNEYS Patented Apr. 9, 1940

2,196,741

UNITED STATES PATENT OFFICE 2,196,741

DOUBLE SHEET STOP

Alvin E. Schubert, Rochester, N. Y., assignor to Eastman Kodak Company, Rochester, N. Y., a corporation of New Jersey Application December 8, 1937, Serial No. 178,790

10 Claims. (Cl. 192—127)

The present invention relates to an apparatus for photographically recording documents, and more particularly to a double sheet stop therefor.

One object of the invention is the provision of an arrangement for preventing the feeding of more than one document at a time through the apparatus.

Another object of the invention is the provision of such an arrangement which automatically stops the entire machine when more than one, or overlapping, documents are fed at one time.

A further object of the invention is the provision of a mechanism for clearing the apparatus of the multiple or overlapping documents.

A still further object of the invention is the provision of a double sheet stop arrangement which is simple in construction, inexpensive to manufacture, and highly effective in use.

To these and other ends, the invention resides in certain improvements and combinations of parts, all as will be hereinafter more fully described, the novel features being pointed out in the claims at the end of the specification.

In the drawings:

Fig. 1 is a side elevation view of an apparatus for photographically recording documents, with parts in section and parts in elevation, showing a double sheet stop constructed in accordance with one embodiment of the invention;

Fig. 2 is a front elevation view of the mechanism illustrated in Fig. 1, as viewed from the right thereof;

Fig. 3 is a diagrammatic view of the electrical wiring diagram for the mechanism illustrated in Figs. 1 and 2;

Fig. 4 is a view similar to Fig. 1, but showing a slightly different arrangement for a double sheet stop in which the micro-switch is mechanically held in open position;

Fig. 5 is a front elevation view of the mechanism illustrated in Fig. 4, as viewed from the right thereof;

Fig. 6 is a diagrammatic view of the electrical wiring diagram for the mechanism illustrated in Figs. 4 and 5;

Fig. 7 is a view similar to Fig. 1, showing still another arrangement of a double sheet stop constructed in accordance with the present invention;

Fig. 8 is a front elevation view of the mechanism illustrated in Fig. 7, as viewed from the right thereof;

Fig. 9 is a diagrammatic view of the electrical wiring diagram for the mechanism illustrated in Figs. 7 and 8; and Fig. 10 is an enlarged fragmentary view of a portion of the mechanism illustrated in Fig. 7, showing the arrangement for yieldably retaining the straightening roller in engagement with the feeding drum.

Similar reference numerals throughout the various views designate the same parts.

The present invention relates, in its broadest aspects, to an arrangement for preventing the feeding of more than one sheet, strip, or card, at a time through a machine. More specifically, the invention is embodied in a double sheet stop for use with machines for photographically recording documents, such as shown and described in the patent to C. J. Hughey, Number 1,976,346, dated October 9, 1934. In such machines, it is imperative that only one document at a time be fed through the photographic field so that all the information on the document may be recorded. If two or more, or overlapping, documents are fed at one time, some or all of the information thereon would, obviously, be covered and would not, therefore, be photographed. Even a careful operator is apt to inadvertently feed two or more sheets at a time, or to feed the second sheet too soon after the first sheet, thus causing partial or total overlapping of the sheets.

In order to overcome these difficulties, the present invention provides an arrangement by which the passage of two or more, or overlapping, documents will automatically shut down the entire apparatus, thus immediately notifying the operator that the document has been improperly fed. This arrangement comprises, in general, a pivotally mounted micro-switch which is arranged in series with the drive motor for the feeding drum. This micro-switch remains closed when single documents are passed through the machine, but when two or more documents are fed at one time, the switch is automatically opened to break the circuit to the motor and thus stop the machine. The movement of the switch is controlled by means of a bellcrank, one arm of which engages the switch while the other arm carries a roller which rides on the feeding drum or the straightening roller, which will be hereinafter more fully described.

The feeding drum 11 is mounted on the shaft 12 which is journaled in the opposite sides of the machine frame. The documents, generally indicated by the numeral 13, may be fed through the feed hopper 14, thence under the straightening roller 15, and finally through the photographic field of a camera, not shown, to be photographed thereby. The roller 15 is mounted on a small flexible shaft 16, Figs. 1 and 4, secured in the opposite sides of the machine frame. A second shaft 17 extends across the machine just above the shaft 16, and supports one end of a plurality of document guide wires, not shown, which hold the documents against the drum during the passage thereof through the photographic field of the camera. As the documents are fed under the straightening roller 15 they engage trip fingers 18 movably mounted on the trip shaft 19. These trip fingers engage the forward edge of each document and cooperate with the straightening roller 15 to properly align the document prior to the passage thereof through the photographic field of the camera. The above construction is all clearly shown and described in the applicant's co-pending application Number 157,361, filed August 4, 1937, to which reference may be had for a more complete description. The drum 11 is operatively connected to and driven by an electric motor 20, in the manner shown in the above-mentioned patent to Hughey, and need not be herein described. A suitable light bank 21 is provided adjacent the drum 11 to illuminate the documents 13 during the passage thereof through the field of the camera.

In the embodiment illustrated in Fig. 1, a U-shaped bracket of any suitable material, preferably metal, is formed to provide spaced side members 23 and a connecting back member 24. The sides 23 are extended downwardly below the member 24, as shown at 25, Fig. 1, and are provided with registering openings 26 through which the shaft 17 extends to support the bracket, as will be apparent from an inspection of Fig. 1. The sides 23 are provided with bearings 27 in which is pivotally mounted a micro-switch 28, of any well-known construction, arranged in series with the motor 20, as shown in Fig. 3. The switch 28 is movable relative to the sides 23, in a manner to be later described, to engage an adjustable stop which limits further movement of the switch and thus opens the latter to break the motor circuit. This stop is preferably in the form of an adjustable screw 29 which extends through the back member 24 and into the path of the switch 28. The head 30 of the screw 29 projects through the side 31 of the hopper 14 so that the screw may be adjusted to thus regulate the amount of movement necessary to open the switch 28.

The depending portions 25 of the sides 23 support the opposite ends of a shaft 33 on which a pair of spaced flat members 34, of the shape best shown in Fig. 1, are loosely supported. The upper ends of the members 34 are connected by a cross or tie member 35, while the lower ends carry a shaft 36 on which a roller 37 is rotatably mounted. Suitable spaces 38 are interposed between the members 34 and the roller 37 to properly align the latter with the straightening roller 15 on which the roller 37 rides as clearly shown in Fig. 1. The members 34 thus form, in effect, a bellcrank, one arm of which carries the roller 37, and the other arm carries the cross-piece 35 which engages the pivoted micro-switch 28 to move the latter about its pivot 27.

It will be apparent from an inspection of Fig. 1, that when the documents 13 are fed under the straightening roller 15, the latter will be lifted slightly, in a radial direction, the amount of such movement being equal to the thickness of the document. This movement of the roller 15 will correspondingly move the roller 37, and thus rock the bellcrank members 34 to cause the member 35 to engage and move the micro-switch 28 about its pivot 27. When, however, a single document is passed under the roller 15 the switch 28 is not moved sufficiently to engage the stop screw 29 and the switch remains closed. On the other hand, when two or more, or overlapping, documents are fed through the machine at one time, the increased thickness of the documents is sufficient to move the switch 28 into engagement with the stop 29 so as to momentarily open the switch 28, as indicated in dotted lines Fig. 3.

This momentary opening of the micro-switch 28 energizes a coil 39 of a manual reset relay 40 which is shunted across the switch 28, as clearly indicated in Fig. 3. The energizing of the coil 39, draws the solenoid core 41 downwardly, as is well known, to move the member 42 out of engagement with the contacts 43, as shown dotted in Fig. 3, thus opening the motor circuit and stopping the entire apparatus. By means of this arrangement, the operator is immediately informed that two or more documents have been inadvertently fed at one time. It remains, however, to clear the machine of these two or overlapping documents. To accomplish this, the core 41 is manually reset to again connect the member 42 across the contacts 43 to thus close the motor circuit. After the documents have cleared the roller 15, the micro-switch 20 automatically moves away from the screw 29 and closes. The cleared documents may now be separately fed through the machine and photographed.

It is often desirable to photograph and record documents which are of such thickness as to open the micro-switch 28, as above described. In order to enable these thicker documents to be fed through the machine, the present invention provides an auxiliary means for maintaining the motor circuit in closed position even when the micro-switch is open by reason of the increased thickness of the documents which are passed under the roller 15. This auxiliary means is preferably in the form of a self opening starting switch 45, of any suitable construction, which is connected or shunted across the micro-switch, as shown in Fig. 3. Thus, even when the micro-switch 28 is open, the motor circuit may still be completed by closing the switch 45, thus permitting these thicker documents to be passed through the photographic field of the camera and photographed thereby. After this thicker document has been passed through the field of the camera, the switch 45 is released, and automatically opened under the action of a spring, not shown.

Figs. 4 and 5 show a slightly modified arrangement in which the micro-switch 28 is mechanically held in open position. The parts corresponding to those in Fig. 1 are designated by the same numerals. In this arrangement, one of the side members 23 is extended upwardly, as shown at 47, and has pivotally mounted on the upper end thereof, a latch 48 of the shape best shown in Fig. 4. One end of this latch is provided with a hooked portion 49, while the other end 50 thereof projects through an opening 51 in the side 31 of the hopper 14 to provide an engaging portion by which the latch may be released, as will be later described. A spring 52 is wrapped around a stud 53 on the extended portion 47 of the side 23, and has one end 54 thereof hooked over an edge 55 of the portion 47, while the other end 56 engages the under side of the latch 48, and tends to rotate the latter in a clockwise direction about its pivot 57, as is apparent from an inspection of Fig. 4.

In this second embodiment, the cross member 35 is formed to provide a long, thin, tapering arm or operating lever 60 of the shape best shown in Fig. 5. It will be apparent upon inspection of Fig. 4, that when the members 34 are pivoted sufficiently about the shaft 33 to open the micro-switch 28, the lever 60 will be moved to the left to bring the end 61 thereof under the hooked portion 49 of the latch 48. This hooked portion thus engages the lever 60 and positively holds the micro-switch in open position, thus stopping the machine. The adjustment is such that the latch 48 does not, however, engage the lever 60 when only single documents are fed through the machine. It is obvious, of course, that by using the latch 48 the manual reset relay 40, used in the first embodiment, may be omitted.

The machine may be cleared by closing the self-opening switch 45 which is shunted across the micro-switch 28, as above described. After the machine has been cleared, the end 50 of the latch 48 is depressed to release the lever 60, and the micro-switch then swings to close position. This starting switch 45 may also be used when thick documents are fed through the machine, as above described.

Fig. 7 show still another modification in which the straightening roller 15 is mounted directly on the shaft 36, and also rides on the surface of the drum 11, thus eliminating the roller 37. In this embodiment, an an adjustable screw member 63 extends through a boss 64 on the cross member 35, and engages the micro-switch 28. By moving this screw 63 in or out, the micro-switch may be adjusted for the document thickness which is necessary to open the switch. The screw 63 may be readily adjusted by means of a knurled fingerpiece 65 secured to or formed integral with the end of the screw. A lock nut 66 holds the screw 63 in adjusted position. In this embodiment the roller 15 thus acts both as a straightening roller and a thickness gauge, as is apparent from an inspection of the drawings.

The roller 15 is yieldably pressed or held in engagement with the drum 11. To secure this result, a leaf spring 70, of the shape best shown in Fig. 10, has the ends 71 thereof suitably secured to the spaced side members 23. The intermediate portion 72 of the spring 70 is fastened, in any well-known manner, to a tongue 73 projecting upwardly from and preferably formed integral with the cross-piece 35. When the roller 15 is lifted by documents passing thereunder, the tongue 73 moves to the left, as viewed in Fig. 7, thus flexing or tensioning the portion 72 of the spring 70. After the document has passed beyond the roller 15, the portion 72 of the spring then straightens out and thus moves the tongue 73 to the right, as viewed in Fig. 7, to yieldably press and hold the roller 15 in engagement with the drum 11.

When two or more documents are fed under the roller 15, the micro-switch 28 is pivoted to bring a spring pressed plunger 75 thereof into engagement with the end 76 of a slightly yieldable leaf spring 77, to move the plunger to the right, as viewed in Fig. 7, to open the switch. The other end 78 of the spring 77 is secured by rivets or other suitable fastening means to the back 24. The spring 77 is sufficiently stiff so as to be substantially stationary when only two, or at least a few, documents are fed at one time under the roller 15. If, however, a stack of checks or documents were accidentally dropped into the feed hopper 14, thus lifting the roller 15 and moving the micro-switch an abnormal amount, the spring 77 will yield sufficiently so as to prevent breakage of or damage to the micro-switch. A manual reset relay, identical with 40, may be closed to clear the machine. A starting switch 45 may also be provided so that thicker documents may be passed through the machine and photographed thereby.

It is thus apparent from the above description, that the present invention provides a double sheet stop which effectively prevents the inadvertent feeding of more than one document at a time through the photographic field of the camera, thus insuring that all the documents will be fully photographed. It is further evident that the attempted passage of two or more documents will automatically stop the machine, thus clearly indicated to the operator that the documents have been improperly fed. After the machine is thus stopped, it may be easily and readily restarted to clear the multiple or overlapping documents. While the above described double stop is highly effective, it is also extremely simple in construction, and relatively inexpensive to manufacture.

While certain embodiments of the invention have been disclosed, it is to be understood that the inventive idea may be carried out in a number of different ways. This application is, therefore, not to be limited to the precise details described, but is intended to cover all variations and modifications thereof falling within the spirit of the invention and the scope of the appended claims.

I claim:

1. In an apparatus for photographically recording documents, the combination with a rotating feeding drum for conveying documents through the photographic field of a camera to be photographed thereby, an electric motor for driving said drum, of a pivotally mounted roller arranged to engage said documents to hold the latter against said drum, a pivoted electrical switch arranged in the circuit of said motor, and means movable into engagement with said switch and actuated by said roller to move said switch about its pivot to open the latter to stop said motor when two or more documents are fed at one time.

2. In an apparatus for photographically recording documents, the combination with a rotating feeding drum for conveying documents through the photographic field of a camera to be photographed thereby, an electric motor for driving said drum, of a pivotally mounted roller arranged to engage said documents to hold the latter against said drum, a pivoted electrical switch arranged in the circuit of said motor, means movable into engagement with said switch and actuated by said roller to move said switch about its pivot to open the latter to stop said motor when two or more documents are fed at one time, and means independent of said switch for closing said motor circuit to clear said two or more documents from said apparatus.

3. In an apparatus for photographically recording documents, the combination with a rotating feeding drum for conveying documents through the photographic field of a camera to be photographed thereby, an electric motor for driving said drum, of a roller arranged to engage said documents to hold the latter against said drum, a support in which said roller is pivotally mounted, an electrical switch connected in the circuit of said motor and pivotally mounted on said support, means movable into engagement with said switch and movable by said roller to pivot said switch when two or more documents are fed at one time, a stop mounted on said support in the path of said pivoted switch and arranged to operate the latter to open said motor circuit, and a second switch independent of said first switch for closing said motor circuit.

4. In an apparatus for photographically recording documents, the combination with a rotating feeding drum for conveying documents through the photographic field of a camera to be photographed thereby, an electric motor for driving said drum, of a roller arranged to engage said documents to hold the latter against said drum, a support on which said roller is pivotally mounted, an electrical switch arranged in the circuit of said motor and pivotally mounted on said support, a bell crank lever pivoted on said support and having one arm thereof in engagement with said switch, a second roller rotatably mounted on the other arm of said bell crank and positioned adjacent said first mentioned roller, the latter roller being movable radially to actuate said second roller to move and open said switch when two or more documents are fed at one time and means for maintaining said circuit in open position.

5. In an apparatus for photographically recording documents, the combination with a rotating feeding drum for conveying documents through the photographic field of a camera to be photographed thereby, an electric motor for driving said drum, of a roller arranged to engage said documents to hold the latter against said drum, a support on which said roller is pivotally mounted, an electrical switch arranged in the circuit of said motor and pivotally mounted on said support, a bell crank lever pivoted on said support and having one arm thereof in engagement with said switch, a second roller rotatably mounted on the other arm of said bell crank and positioned adjacent said first mentioned roller, the latter roller being movable radially to actuate said second roller to move and open said switch when two or more documents are fed at one time, means for maintaining said circuit in open position after the operation of said switch, and a manual reset relay independent of said switch for again closing said motor circuit.

6. In an apparatus for photographically recording documents, the combination with a rotating feeding drum for conveying documents through the photographic field of a camera to be photographed thereby, an electric motor for driving said drum, of a roller arranged to engage said documents to hold the latter against said drum, a support on which said roller is pivotally mounted, an electrical switch arranged in the circuit of said motor and pivotally mounted on said support, a bell crank lever pivoted on said support and having one arm thereof in engagement with said switch, a second roller rotatably mounted on the other arm of said bell crank and positioned adjacent said first mentioned roller, the latter roller being movable radially to actuate said second roller to move and open said switch when two or more documents are fed at one time, a releasable latch on said support arranged to engage said one arm to hold the switch in open position, and an auxiliary starting switch for closing said motor circuit.

7. In an apparatus for photographically recording documents, the combination with a rotating feeding drum for conveying documents through the photographic field of a camera to be photographed thereby, an electric motor for driving said drum, of a roller arranged to engage said documents to hold the latter against said drum, a support on which said roller is pivotally mounted, an electrical switch arranged in the circuit of said motor and pivotally mounted on said support, a bell crank lever pivoted on said support and having one arm thereof in engagement with said switch, a second roller rotatably mounted on the other arm of said bell crank and positively engaging said first mentioned roller, the latter roller being movable radially to actuate said second roller to pivot and open said switch when two or more documents are fed at one time, an operating lever on said one arm, a spring pressed latch on said support arranged to engage said lever to hold said switch in open position when the latter has been moved by said one arm, and an auxiliary starting switch shunted across said first switch to close said motor circuit.

8. In an apparatus for photographically recording documents, the combination with a rotating feeding drum for conveying documents through the photographic field of a camera to be photographed thereby, an electric motor for driving said drum, of a roller arranged to engage said documents to hold the latter against said drum, a support in which said roller is pivotally mounted, an electrical switch arranged in the circuit of said motor and pivotally mounted on said support, a bell crank lever pivoted on said support and having one arm thereof in engagement with said switch, a second roller rotatably mounted on the other arm of said bell crank and positioned adjacent said first mentioned roller, the latter roller being movable radially to actuate said second roller to move and open said switch when two or more documents are fed, a manual reset relay arranged in said circuit and shunted across said switch to maintain said circuit in open position, and a switch shunted across said first switch to close said circuit when said first switch and relay are in open position to permit the feeding of thick documents through the apparatus.

9. In an apparatus for photographically recording documents, the combination with a rotating feeding drum for conveying documents through the photographic field of a camera to be photographed thereby, an electric motor for driving said drum, of a roller arranged to engage said documents to straighten the latter and to hold them against said drum, a bracket on which said roller is rotatably mounted, a support on which said bracket is pivotally mounted adjacent said roller, a switch pivoted on said support, said roller being movable radially to move said bracket in one direction about its pivot when two or more documents are fed at one time, a member on said bracket arranged to engage said switch to move the latter when said bracket is moved in said one direction, a slightly yieldable stop on said support engageable by said switch to open the latter, said stop being ordinarily substantially stationary but movable relative to said support when a large number of documents are passed at one time under said roller, and resilient means engaging said bracket to move the latter in the opposite direction to bring said roller into engagement with said drum.

10. In an apparatus for photographically recording documents, the combination with a rotating feeding drum for conveying documents through the photographic field of a camera to be photographed thereby, an electric motor for driving said drum, of a roller arranged to engage said documents to straighten the latter and to hold them against said drum, a bracket on which said roller is rotatably mounted, a support on which said bracket is pivotally mounted adjacent said roller, a switch pivoted on said support, said roller being movable radially to move said bracket in one direction about its pivot when two or more documents are fed at one time, an arm on said bracket, an adjustable member on said arm arranged to engage and move said switch when said bracket is moved in one direction, a slightly yieldable stop on said support engageable by said switch to open the latter and thus break the motor circuit, said stop being of sufficient rigidity as to remain substantially stationary when only a single document is fed under said roller but moveable relative to said support when a large number of documents are passed at one time under said roller whereby said bracket and said switch are protected against breakage, a spring on said support engaging said arm and tending to move said bracket in the opposite direction to move said roller into engagement with said drum, and a starting switch independent of said first-mentioned switch for closing said motor circuit so that said drum may be rotated to clear the apparatus.

ALVIN E. SCHUBERT.